United States Patent [19]

Dolenc

[11] Patent Number: 4,849,732

[45] Date of Patent: Jul. 18, 1989

[54] ONE HAND KEY SHELL

[76] Inventor: Heinz C. Dolenc, 104 Water St., Stonington, Conn. 06378

[21] Appl. No.: 175,684

[22] Filed: Mar. 21, 1988

Related U.S. Application Data

[63] Continuation of Ser. No. 769,012, Aug. 23, 1985, abandoned.

[51] Int. Cl.$^4$ .............................................. G06F 3/023
[52] U.S. Cl. .................................... 341/20; 200/5 R; 400/100; 400/486; 400/489; 341/23
[58] Field of Search ........ 340/365 R, 365 VL, 365 S; 200/5 R, 6 A, 52 R; 235/145 R; 84/451; 400/87, 88, 100, 485, 473, 474, 475, 476, 483, 493, 486, 487, 488, 489; 364/706, 709

[56] References Cited

U.S. PATENT DOCUMENTS

| | | |
|---|---|---|
| 1,487,115 | 3/1924 | McQurrie . |
| 3,022,878 | 2/1962 | Seibel et al. . |
| 3,200,689 | 8/1965 | Rosberger . |
| 3,225,883 | 12/1965 | Ayres . |
| 3,428,747 | 2/1969 | Alferief . |
| 3,705,424 | 12/1972 | Harvey, Jr. . |
| 3,831,296 | 8/1974 | Hagle . |
| 3,835,468 | 9/1974 | dos Santos . |
| 3,943,811 | 3/1976 | Coles ...................................... 84/451 |
| 3,945,482 | 3/1976 | Einbinder ............................ 400/484 |
| 3,980,823 | 9/1976 | Howard . |
| 4,005,388 | 1/1977 | Morley et al. . |
| 4,042,777 | 8/1977 | Beguarert et al. .................... 400/100 |
| 4,067,431 | 1/1978 | Whitaker . |
| 4,074,444 | 2/1978 | Laenger, Sr. et al. . |
| 4,092,527 | 5/1978 | Luecke ........................... 340/365 VL |
| 4,263,659 | 4/1986 | Hirata et al. ...................... 340/365 C |
| 4,275,443 | 6/1981 | Sorin ................................ 340/365 R |
| 4,360,892 | 11/1982 | Endfield . |
| 4,414,537 | 11/1983 | Grimes . |
| 4,442,506 | 4/1984 | Endfield . |
| 4,443,789 | 4/1984 | Endfield et al. . |
| 4,449,839 | 5/1984 | Bleuer ................................ 400/485 |
| 4,454,501 | 6/1984 | Butts ............................. 340/365 VL |
| 4,458,238 | 7/1984 | Learn . |
| 4,467,321 | 8/1984 | Volnak . |
| 4,549,279 | 10/1985 | Lapeyre .......................... 340/365 R |
| 4,584,443 | 4/1986 | Yaeger .............................. 340/365 R |

FOREIGN PATENT DOCUMENTS

| | | |
|---|---|---|
| 1496522 | 12/1977 | United Kingdom . |
| 2015220 | 9/1979 | United Kingdom . |
| 2076743 | 12/1981 | United Kingdom . |

OTHER PUBLICATIONS

D. C. Kowalski-Xerox Disclosure Journal-"Semi-capacitive Keyboard"-vol. 1 No. 2, Feb/76-p. 85.

W. C. McCornack-IBM Technical Disclosure Bulletin-"Single Keybutton Four-way switch"-vol. 21 No. 8 Jan/79-p. 326.

Primary Examiner—John W. Caldwell, Sr.
Assistant Examiner—Mahmand Fatahi-Yar
Attorney, Agent, or Firm—Weingarten, Schurgin, Gagnebin & Hayes

[57] ABSTRACT

A self-contained data terminal or typewriter keyboard completely operable by a single human hand for the input of information into a computer or other electronic device. The keyboard comprises five sets of keys, each set aligned respectively with the thumb, index finger, middle finger, ring finger, and small finger of an extended hand. Complementary orientation and positioning of the sets are determined by whether the terminal is to be used by a right-handed or left-handed user. The control keys may be used to manipulate text or other information entered into the attached device and are operated by the thumb. The character keys consist primarily of letters of the alphabet, numbers, and punctuation sets and are positioned below the remaining four fingers. The terminal is operated in a single keystroke character input mode. Several data control keys can also be mounted to the terminal to perform additional text manipulation functions, similar to the control keys, or any other necessary commands. By using single keystroke input keys according to the present invention, data input is faster and easier than with conventional terminals because only one hand is necessary, and there are fewer and less complex character input commands to memorize.

34 Claims, 7 Drawing Sheets

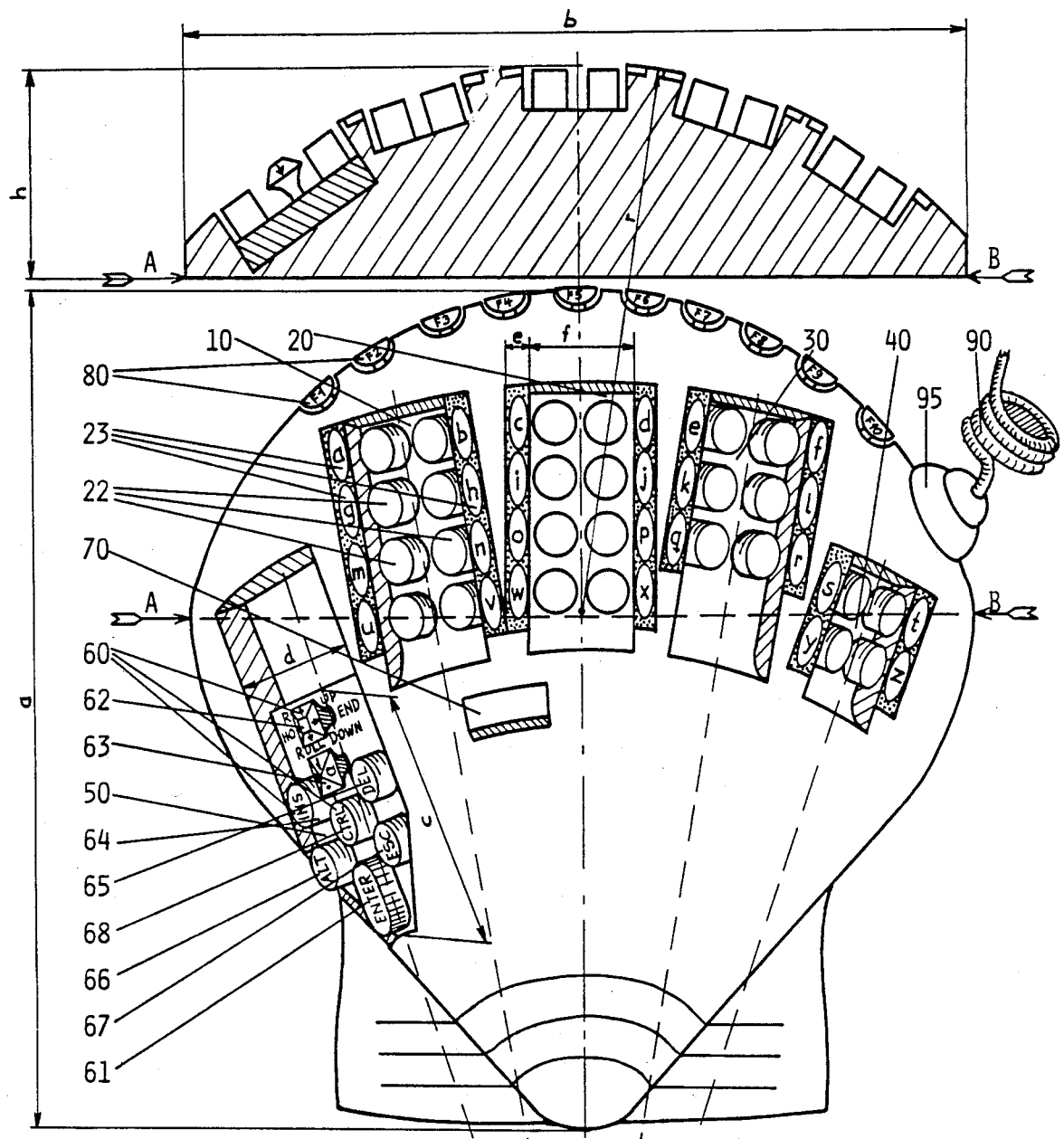
FIG 2　　　MODEL 1

MODEL 2

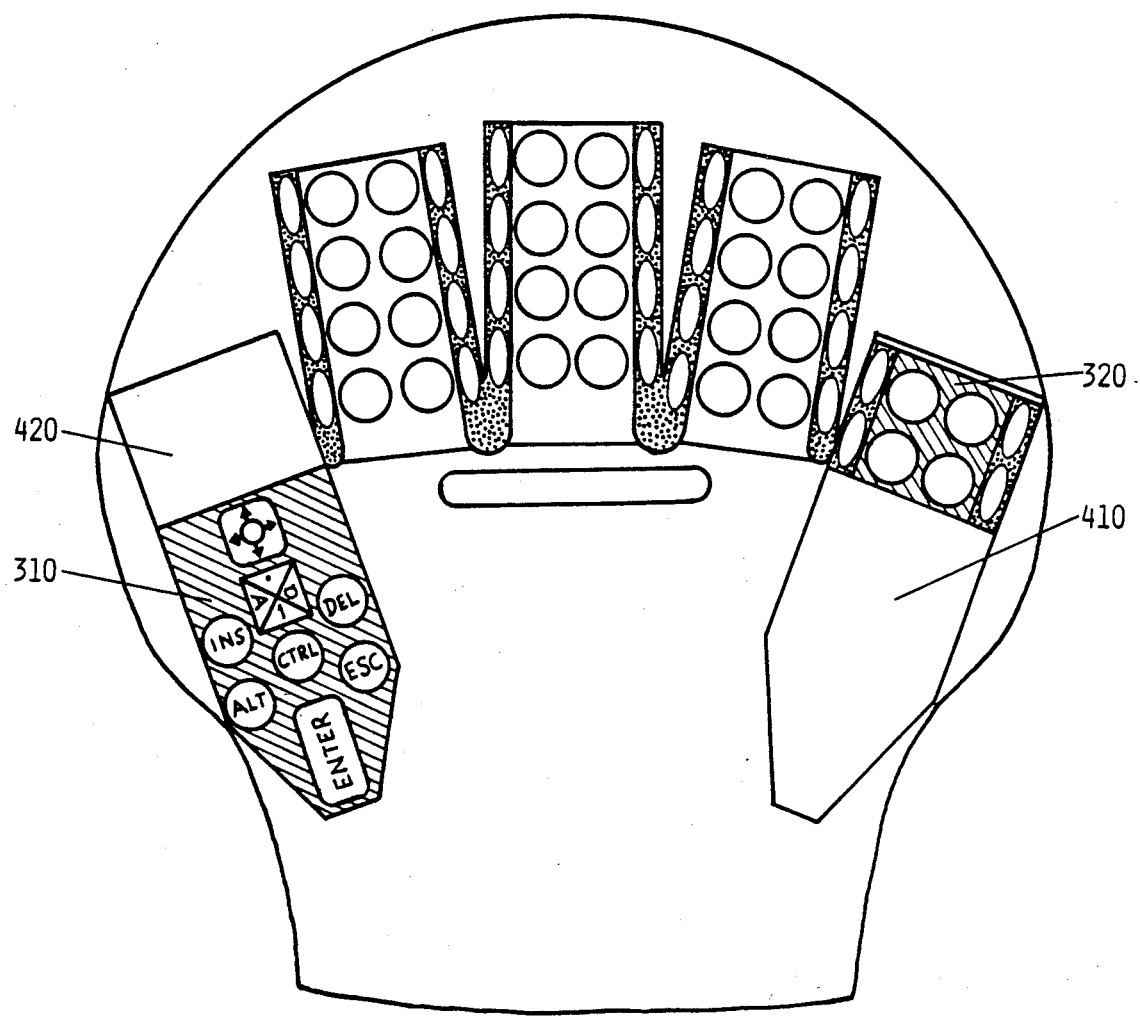
FIG 5  MODEL 3

ONE HAND KEY SHELL

This application is a continuation of application Ser. No. 769,012, filed Aug. 23, 1985, now abandoned.

FIELD OF THE INVENTION

The present invention relates to a data input or typewriter keyboard device. It is fully operable by a single human hand.

BACKGROUND OF THE INVENTION

Previous data input or typewriter terminals have consisted of either a standard typewriter keyboard format, where each key enters a specific character, or a system which involves manipulation of a set of keys through complex data entry schemes which require the operator to memorize pushbutton positions for all letters of the alphabet, punctuation, numbers, and input control functions, such as entering data and shifting from lower case to upper case, and any other specialized symbols. The prior art data entry schemes of the latter system are based upon activating one or more keys in a specific pattern to produce a given character, with most characters requiring the use of several keys simultaneously. One invention which utilizes the data entry scheme system requires the user to manipulate five four-position transducer units, one unit assigned to each of the fingers of the user's hand. The switches in the units move linearly from one position to another, wherein different characters are entered by varying the positions of each of the switches in the transducer units (U.S. Pat. No. 3,022,878 by Seibel). Other devices utilize simple finger-activated unidirectional pushbuttons rather than complex multiposition transducer switches. The pushbuttons are arranged in various configurations, such as key arrangements which include mounting the buttons to a cylindrical handgrip, displaying them in a rectangular array, and positioning an array of five keys on a planar surface with one key designated for each finger. The five-key planar array terminal utilizes a character pushbutton combination system whereby the input keys for most letters of the alphabet correspond to positions on a five-point inverted parabola that roughly conform to the outline of the letter or its interception points when placed on the grid. For example, a "b" has contact points at the apex coordinate and the two-point positions on the right side of the parabola, because the open loop of the letter is located on the right side of the shaft. A "d," on the other hand, would contact the apex and the two points on the left side of the grid (U.S. Pat. No. 3,980,823 by Howard, U.S. Pat. No. 4,442,506 and 4,443,789 by Endfield).

One variation of the previously mentioned data entry scheme locates flex sensors, touch sensors, and tilt sensors on various locations of a glove which fits over the hand. The sensors were activated either individually or in series by flexing certain joints or touching certain areas of the hand, resulting in a given command. The glove was used to input characters using "sign language." However, the glove was problematic, as the sensors were difficult to adjust to eliminate inadvertent activation by flexing, tilting, or touching. Moreover, the uncertainty as to the degree of tilt or flex necessary to input characters presented another drawback to the user of the glove device since the flex and tilt sensors were to be operated by hand movements not normally performed by the user in everyday life (U.S. Pat. No. 4,414,537 by Grimes).

A second embodiment similar to the glove device locates touch sensors on the inner surface of a mold made to conform to the shape of a human hand. A total of eight touch sensors are distributed such that the thumb and heel of the hand contact two switches each, while the remaining fingers each have one switch. As discussed in regard to the other embodiments, the data entry scheme system requires the user to press multiple buttons in combinations.

In summary, the prior art includes character input terminals operated by one hand which force the operator to remember complex pushbutton schemes, most conceived without any logical scheme as to which keys are used for certain characters. Therefore, today the user of such a terminal is faced with the dilemma of either memorizing the data entry schemes or using a simpler system with fewer possible input commands and thus a less powerful system.

SUMMARY OF THE INVENTION

The electronic data entry or typewriter terminal according to the present invention is completely operational by a single human hand and includes character keys which are separated into four different arrays, positioned and angled to align with the index, middle, ring, and small finger of an extended human hand. Each array contains at most eight keys. A fifth array is mounted to be accessible to the thumb of the same hand and contain those keys necessary to control the input and manipulation of data entered using the character keys. The control keys perform tasks such as entering commands, controlling a cursor, inserting or deleting text, and shifting from lower to upper case characters. A third set of keys, referred to as data control keys, can be mounted to be accessible to several fingers of the hand operating the terminal, and can be used to input similar character or control commands. By requiring only one hand for operation, the apparatus provides the other hand with a degree of freedom not found in standard two-hand models. The system of inputting data using character and control keys is also faster to learn, because the keys are organized into five distinct arrays. The keyboard organization, by placing the keys in five arrays, provides a format that is not only easier to memorize, but also simpler for the user to comprehend.

BRIEF DESCRIPTION OF THE DRAWINGS

These and other features of the invention will be better understood from the following detailed description, taken together with the drawing, wherein:

FIG. 2 is a detailed view of the version of the terminal keyboard according to FIG. 1C;

FIG. 5 is a pictorial view of a third embodiment with interchangeable control key and character key arrays to convert from right-to left handed user orientation and vice versa;

DETAILED DESCRIPTION OF THE INVENTION

Figure 1A:
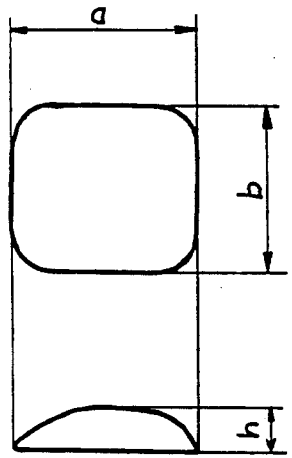
FIGS. 1A–1D are full-face and cross-sectional views of four different embodiments for the terminal along with a range of dimensions for each.
Figure 1B:
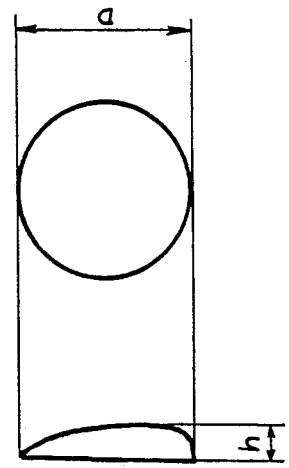
Figure 1C:
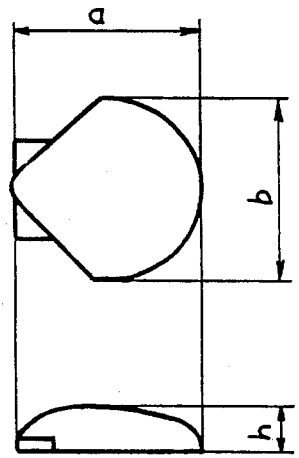
Figure 1D:
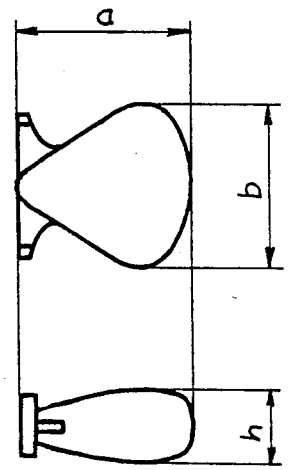

Referring to the drawings, there is shown a data input device or typewriter keyboard. When used as a data input terminal, the device would be linked to communicate with a computer or other similar electronic apparatus. The present invention could also be employed as a one-hand operated typewriter when connected to a mechanical printing unit. The keyboard may be either free-standing as a separate terminal or incorporated into a larger console. When free-standing, the planular side containing the input keys can be in a variety of shapes. These can include a square with rounded corners, a circle, a "shell" configuration, and a triangle with rounded corners with a base structure at one point of the triangle as shown in FIG. 1A, 1B, 1C, and 1D, respectively. The side "a" dimensions of each shape range from 14-24 cm, the side "b" dimensions from 12-22 cm, and the side "h" dimensions (the depth of the structure) from 0.1-8.0 cm.

FIG. 2 shows the keyboard configuration of the invention for a right-handed user, although a complementary arrangement of arrays is possible for left-handed users. It consists of four key arrays 10, 20, 30, and 40 of character keys, aligned and positioned to correspond to the location of the index, middle, ring, and small finger of an extended human hand. Each array is composed of a set of keys, which are used to input certain character values into the external electronic device to which the terminal is attached through cable 90 and connector 95. The character keys are preferably arranged in pairs along the axis of the finger to operate them. The values input by the keys include letters of the alphabet, numbers, as well as punctuation and other symbols (such as #, *, $, and τ). Character input value labels 23 are positioned adjacent to the input key to which they pertain. The labels may consist of electronic display fields, which can be changed, along with the character value of the label's corresponding input key, by use of shift key 63. (See detailed description of FIGS. 6A-6C and 7A-7C.) Although the keys are shown as one-directional momentary pushbutton keys, similar to the type of keys found on conventional electronic typewriters, other types of input keys may be employed in the double-row format shown. A series of touchpads, whose operation is similar to that of a touch sensor, could be embedded into a flat panel. The panel, marked so as to identify the location of the touch pads, would then be incorporated into the terminal device at the locations corresponding to the key arrays shown in FIG. 2.

Figure 3A:
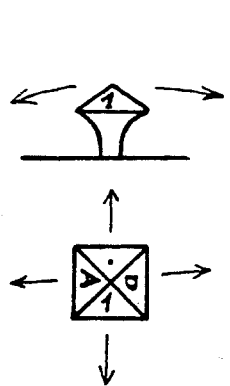
FIG. 3A is a diagrammatic view of a four-directional momentary dip-switch.
Figure 3B:
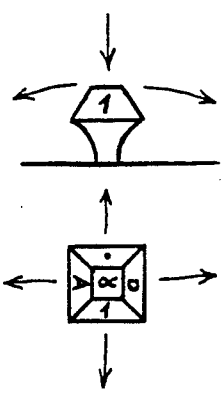
FIG. 3B is a diagrammatic view of a five-directional momentary dip-switch.
Figure 3C:
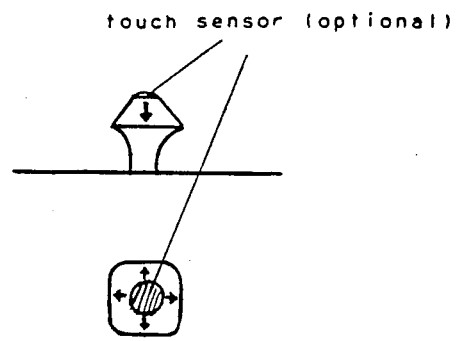
FIG. 3C is a diagrammatic view of a four-directional momentary dip-switch with a touch sensor for a fifth command.
Figure 3D:
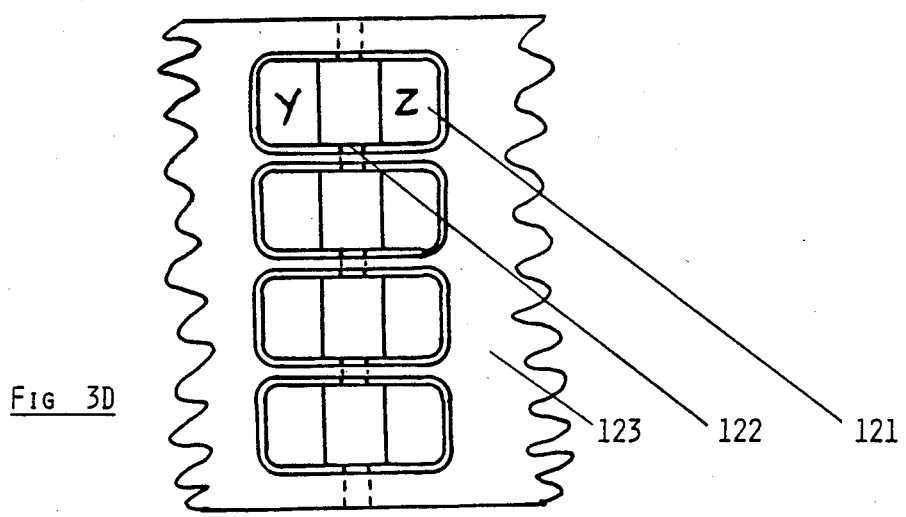
FIG. 3D is a pictorial representation of a row of four bidirectional, momentary rocker switches.
Figure 3E:
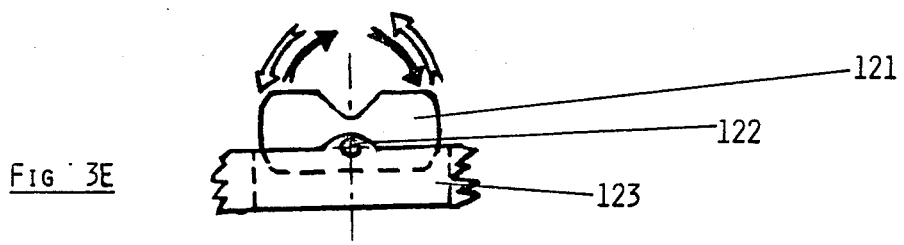
FIG. 3E is a cross-sectional view of one of the four bidirectional, momentary rocker switches shown in FIG. 3D.

A bidirectional, momentary rocker switch is another form of input key which could be incorporated into the present invention. A series of rocker switches are shown in FIG. 3D. The rocker switch is able to produce two different input codes, as shown, for example, by the letters "Y" and "Z" in FIG. 3D. The key consists of a body 121 which is supported on an axle 122, the axle embedded into a base 123. A cross-sectional view of the bidirectional, momentary rocker switch is shown in FIG. 3E with the black and white arrows showing the direction of movement. By pressing down the left side of the body in the direction of the left white arrow, the letter "Y" can be produced. At the same time, the right side of the body swings up into the direction of the right white arrow. Because of that upward movement of the right side of the body, the letter "Z" cannot be produced at the same time as the letter "Y." In order to produce the letter "Z," the operator would have to press the right side of the key, so that the left side swings up (black right and left arrows). When pressure is released, the body swings back into a neutral position. The advantage of a bidirectional, momentary rocker switch as an input key is that it is impossible to mistakenly press down both neighboring characters at the same time, thus reducing the possibility of creating undesirable misprints or typing errors in the document. A series of bidirectional momentary rocker switches could be utilized in lieu of the four key arrays 10, 20, 30, and 40 in FIG. 2 by incorporating one rocker switch for each pair of one-directional momentary pushbuttons.

A space key 70 is positioned on the terminal, such that it can be activated by the palm of the hand while still operating the character and control key arrays.

A fifth array 50 of control keys 60 is mounted to the structure to correspond to the location of the thumb of a human hand. The control key array is positioned in the same plane as the character key array or at any other angular location from which it is accessible by the thumb. In FIG. 2, it is in a plane vertical to the character key arrays. The control keys manipulate the information which has been entered using the character keys. This array includes those control commands found on standard computer terminals. The commands include an enter key 61 to input commands into the attached electronic device. A multidirectional momentary dip-switch, with or without a touch sensor, like in FIG. 3C, used as a cursor control key 62, can be used to maneuver the CRT cursor from point-to-point on the CRT screen. A shift key 63 changes the character key values from lower to upper case as well as to a different set of characters which could include numbers or punctuation. A multi-directional momentary dip-switch can be used for the shift key or, if preferred, a one-directional momentary pushbutton key. Additional information can be inserted into the middle of text already entered by placing the cursor at the desired location for the new entry and using the insert key 64. The character above which the cursor is located can be deleted from text already input by pressing the delete key 65. An alternate key 66, escape key 67, and control key 68, are also included in the control key array. The control key array 50 can slide up and down in its slot of width "d" and can be fixed in a certain position, in order to adjust the key shell for different sizes of operating hands.

Data control keys 80 are used to perform functions in the manipulation of entered text, and are mounted on the edge of the upper rim of the free-standing terminal in FIG. 2. However, their location is not necessarily fixed and thus they could be mounted at another location as long as they are in electronic communication with the terminal. The data control keys contain management input functions other than those embodied in the control key array. The control commands include margin left, margin right, and tab keys to facilitate paragraphing, line length, and the making of tables and charts. An optional repeat key is also incorporated to replicate the previously input character value. A given length of text could be eliminated from memory through the use of an erase key.

Figure 4A:
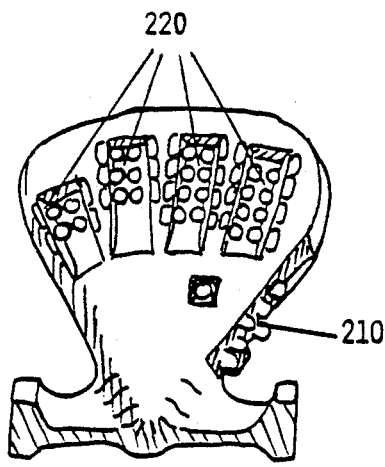
FIGS. 4A-4F are pictorial views of a second embodiment of the keyboard with one control key array and two sets of character key arrays, one for right-handed users and the other for left-handed users.
Figure 4B:
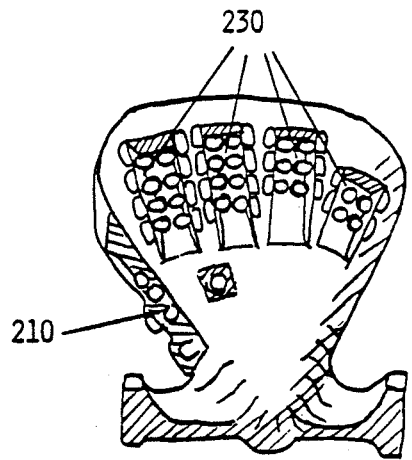
Figure 4C:
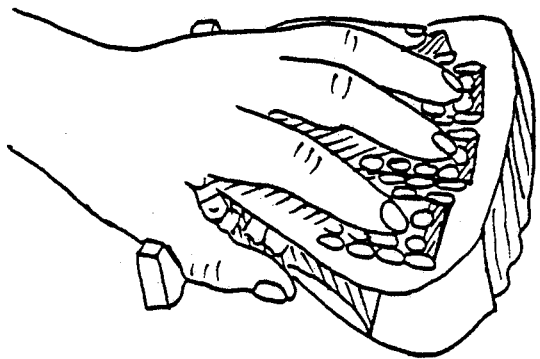
Figure 4D:
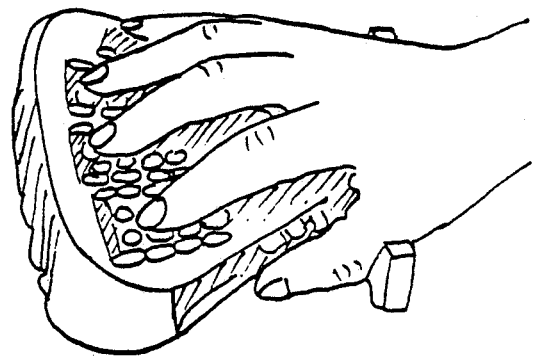
Figure 4E:
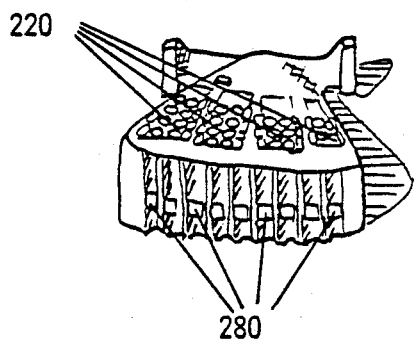
Figure 4F:
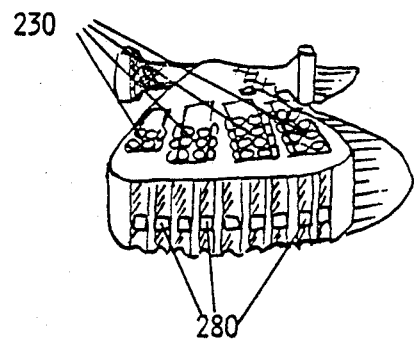

Top and bottom views of a second free-standing embodiment of the terminal are shown in FIGS. 4A and 4B such that the control key array 210 is accessible to either a right-handed or left-handed user. Two sets of character key arrays are positioned such that they are mounted on oppositely facing sides of the terminal, one designed for left-handed users 220, and the other for right-handed users 230. FIG. 4C shows how the character keys 220 and the control keys 210 are operated by the operator's left hand. FIG. 4D shows how the character keys 230 and the control keys 210 are operated by an operator's right hand. FIG. 4E shows the front view of the key shell with the left-hand character keys 220 facing up, and data control keys 280 (analogous to keys 80 in FIG. 2) facing toward the front. The right-hand character keys 230 are invisible in FIG. 4E because they are facing down towards the surface of the desk on which the key shell is placed. FIG. 4F shows the front view of the key shell with the right-hand character keys facing up and the data control keys 280 facing towards the front. The left-hand character keys 220 in FIG. 4F are facing downwards toward the surface of the desk on which the key shell is placed.

A third embodiment, shown in FIG. 5, can also be used by either a right-handed or left-handed user, because the keyboard contains slots for removable boards which are positioned to correspond to the small finger and thumb array locations of both hands. Removable key board arrays are used for the thumb and small finger. The slots for the changeable arrays are positioned on opposite sides of the keyboard, as shown in FIG. 5. Therefore control key array 310 can be moved to slot 410, and small-finger character key array 320 can be moved to slot 420 to convert the right-hand biased terminal in the figure to a left-hand biased terminal.

Figure 6A:
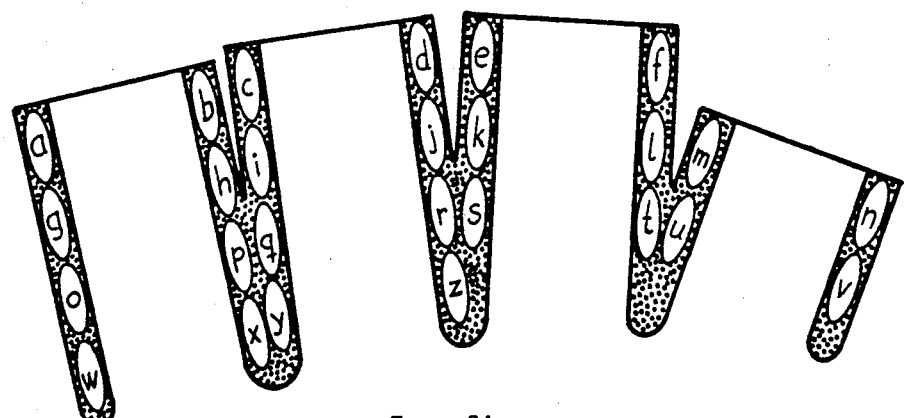
FIGS. 6A-6C are diagrammatic views of the value fields for each key of a right-hand oriented terminal.
Figure 6B:
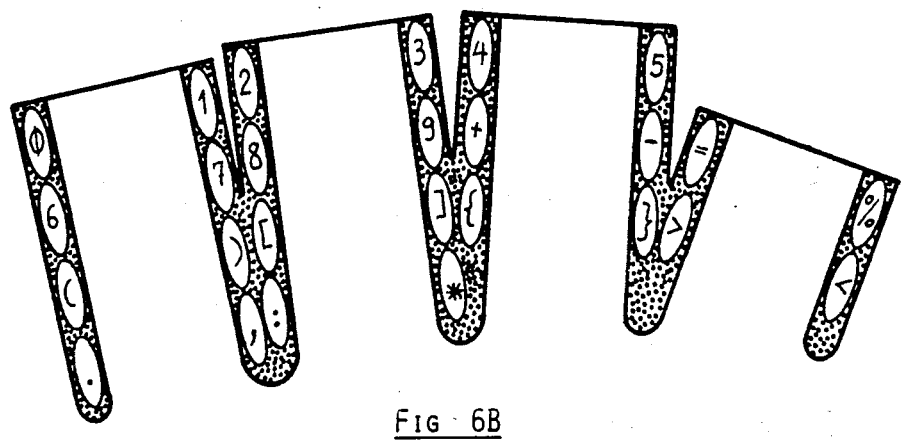
Figure 6C:
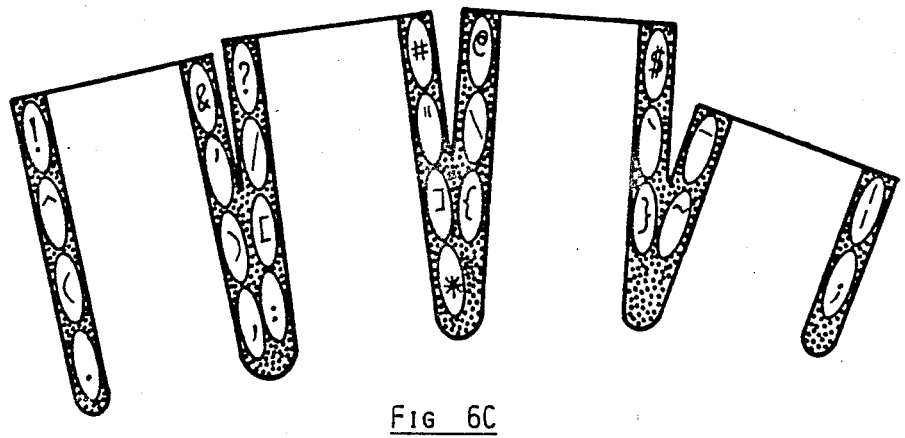
Figure 7A:
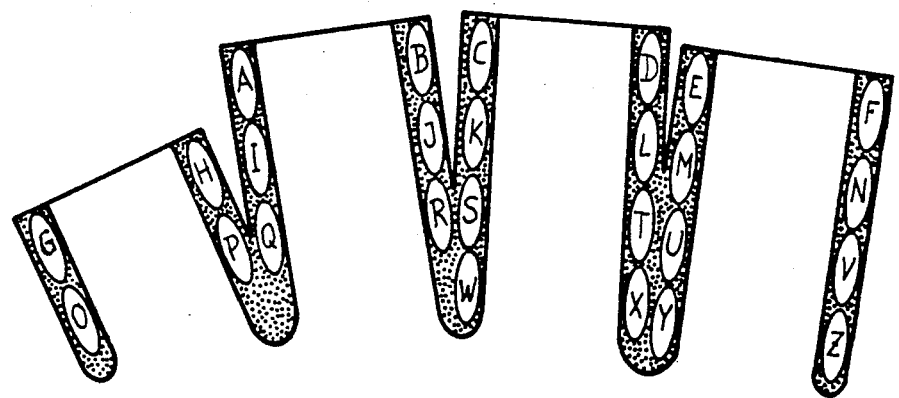
FIGS. 7A-7B are diagrammatic views of the value fields for each key of a left-hand oriented terminal.
Figure 7B:
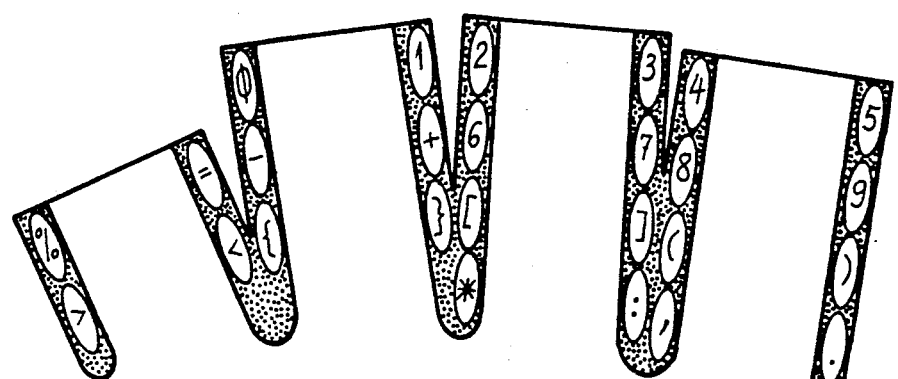
Figure 7C:
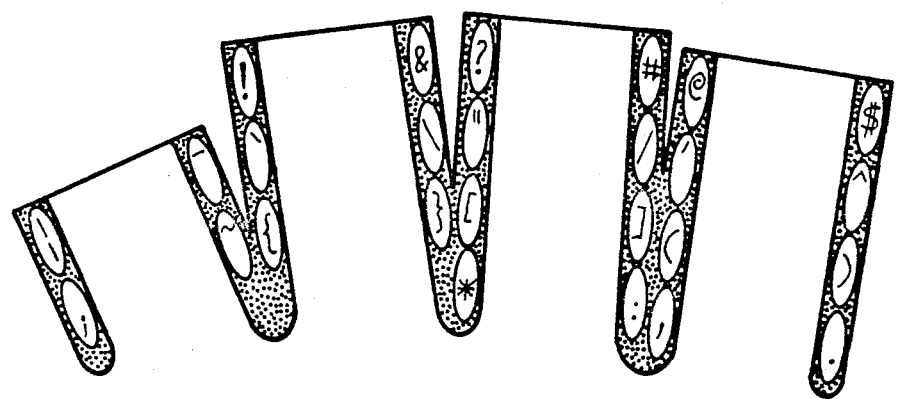

FIG. 6A-6C shows the preferred positioning of letters of the alphabet, numbers, and various symbols for a terminal to be utilized by a right-handed user. FIGS. 7A-7C show the same for a left-handed user terminal. Lower case letters from FIG. 6A may be displayed on key labels which are electronic display fields by the placing of a shift key in a first position. The characters in FIGS. 6B, 7B and FIGS. 6C, 7C are created on the same electronic labels by maneuvering the shift key into second and third positions, respectively upper case letters may be displayed by maneuvering the shift key into a fourth position. If the shift key is a one-directional momentary pushbutton key, then the described groups of characters could be available via a segmented cycle (upon pressing the shift key once, twice, etc.).

The present invention is not limited by the above solely exemplary detailed description. Modifications and substitutions by those skilled in the art are considered within the scope of the present invention. Therefore, the present invention is not to be considered limited except by the following claims.

What is claimed is:

1. An input device operated by a single hand and used to transmit information between the operator of said device and an electronic apparatus in communication with said device, comprising:
   a housing;
   a first key array having a plurality of input means mounted to said housing and operable by the thumb of the hand;
   a second key array having a plurality of input means mounted to said housing, said second array disposed on an array axis which is aligned along a longitudinal axis of and operable by the index finger of the hand when the thumb of the hand is operably positioned proximal to said first array;
   a third key array having a plurality of input means mounted to said housing, said third array disposed on an array axis which is aligned along a longitudinal axis of and operable by the middle finger of the hand when the thumb and the first finger of the hand are operably positioned proximal to said first and second arrays, respectively;
   a fourth key array having a plurality of input means mounted to said housing, said fourth array disposed on an array axis which is aligned along a longitudinal axis of and operable by the fourth finger of the hand when the thumb and the first finger are operably positioned proximal to said first and second arrays, respectively;
   a fifth key array having a plurality of input means mounted to said housing, said fifth array disposed on an array axis which is aligned along a longitudinal axis of and operable by the fifth finger of the hand when the thumb and the first finger are operably positioned proximal to said first and second arrays; and
   label means disposed in close association with a corresponding key, laterally offset from said corresponding key and outwardly disposed from said key array axis, said label means being viewable while the fingers are in contact with said corresponding key, wherein
   said first, second, third, fourth and fifth key arrays are disposed to conform to the positions, motion and range of the respective fingers of the hand allowing activation of the keys without movement of the hand relative to the housing and without movement of said fingers to other of said key arrays, and each said key array includes an axis being non-parallel to the axis of other key arrays.

2. The input device according to claim 1 wherein at least one of said arrays of a plurality of input means comprise control keys.

3. The input device according to claim 2 wherein said at least one control key array is said first key array.

4. The input device according to claim 1 wherein at least one of said input means is a one-directional momentary pushbutton key.

5. The input device according to claim 1 wherein at least one of said input means is a four-directional momentary dip-switch.

6. The four-directional momentary dip-switch according to claim 5 wherein said switch is located in said key array of a plurality of input means and mounted to be operably accessible to the thumb of the hand.

7. The input device according to claim 1 wherein at least one of said input means is a five-directional momentary dip-switch.

8. The five-directional momentary dip-switch according to claim 7, wherein said switch is located in said key array of a plurality of input means and mounted to be operably accessible to the thumb of the hand.

9. The input device according to claim 1, wherein at least one of said input means is a touchpad.

10. The input device according to claim 1, wherein at least one of said input means is a bidirectional, momentary rocker switch.

11. The input device according to claim 1 wherein said input means of said second, third, fourth, and fifth key arrays are arranged in vertically aligned pairs comprising a minimum of 26 keys.

12. The input device according to claim 1, wherein at least one of said arrays of a plurality of input means comprise character keys.

13. The input device according to claim 1, further including at least one data entry key mounted on said housing and operative to be activated by more than one finger of the hand.

14. The input device according to claim 13, wherein at least one of said data entry keys comprises a control key.

15. The input device according to claim 1, further including
at least one input means mounted to said housing and operative for actuation by the palm of said hand while any two fingers of said hand are in physical contact with their respective key arrays.

16. An input device operated by a single hand and used to transmit information between the operator of said device and an electronic apparatus in communication with said device, comprising:
a housing;
a first key array having a plurality of input means mounted to said housing and operable by the thumb of the hand;
a second key array having a plurality of input means mounted to said housing, said second array disposed on an array axis which is aligned along a longitudinal axis of and operable by a first finger of the hand when the thumb of the hand is operably positioned proximal to said first array;
a third key array having a plurality of input means mounted to said housing, said third array disposed on an array axis which is aligned along a longitudinal axis of and operable by a second finger of the hand when the thumb and the first finger of the hand are operably positioned proximal to said first and second arrays, respectively;
a fourth key array having a plurality of input means mounted to said housing, said fourth array disposed on an array axis which is aligned along a longitudinal axis of and operable by a third finger of the hand when the thumb, first finger and second finger of the hand are operably positioned proximal to said first, second, and third arrays, respectively;
a fifth key array having a plurality of input means mounted to said housing, said fifth array disposed on an array axis which is aligned along a longitudinal axis of and operable by a fourth finger of the hand when the thumb, first finger, second finger and third finger of the hand are operably positioned proximal to said first, second, third and fourth arrays, respectively; and
the array axes of the second, third, fourth, and fifth arrays are non-parallel relative to each other providing a spacing between said key arrays maximized at the positions corresponding to the maximum extension of corresponding finger, and wherein
at least one of said key arrays comprises a plurality of key pairs wherein one of the keys of said key pair is selected by lateral motion of the corresponding finger, and the key pair is selected by the extension of the corresponding finger.

17. The input device according to claim 16, wherein said at least one control key array is said first key array.

18. The input device according to claim 16, wherein at least one of said input means is a one-directional momentary pushbutton key.

19. The input device according to claim 16, wherein at least one of said input means is a four-directional momentary dip-switch.

20. The input device according to claim 19, wherein said switch is located in said key array of a plurality of input means and mounted to be operably accessible to the thumb of the hand.

21. The input device according to claim 16, wherein at least one of said input means is a five-directional momentary dip-switch.

22. The input device according to claim 19, wherein said switch is located in said key array of a plurality of input means and mounted to be operably accessible to the thumb of the hand.

23. The input device according to claim 16, wherein at least one of said input means is a touchpad.

24. The input device according to claim 16, wherein at least one of said input means is a bidirectional, momentary rocker switch.

25. The input device according to claim 16, wherein said input means of said second, third, fourth and fifth key arrays are arranged in vertically aligned pairs along the axis of the finger of the hand designated for each.

26. The input device according to claim 16, wherein said device includes labels disposed in close association with a corresponding key, the input values of each of said input means, said input values being viewable while the fingers are in contact with the corresponding key.

27. The input device according to claim 26, wherein said labels comprise changeable display means for displaying selected input values of each corresponding input means by the use of a control key.

28. The input device according to claim 16, further including at least one data entry key mounted on said housing and operative to be activated by more than one finger of said hand.

29. The input device according to claim 28, wherein at least one of said data entry keys comprises a control key.

30. The input device according to claim 16, further including
at least one input means mounted to said housing and operative for actuation by the palm of said hand while any two fingers of said hand are in physical contact with their respective key arrays.

31. The input device according to claim 16 wherein at least one of said arrays of a plurality of input means comprise control keys.

32. An input device operated by a single hand and used to transmit information between the operator of said device and an electronic apparatus in communication with said device, comprising:
a housing;

a first key array having a plurality of input means mounted to said housing and operable by the thumb of the hand;

a second key array having a plurality of input means mounted to said housing, said second array aligned along a path substantially parallel to a longitudinal axis of an extended first finger of the hand such that the second key array is operable by said first finger when the thumb of the hand is operably positioned proximal to said first array;

a third key array having a plurality of input means mounted to said housing, said third array aligned along a path which is substantially parallel to a longitudinal axis of an extended second finger of the hand such that the third array is operable by the second finger when the thumb and first finger are operably positioned proximal to said first and second arrays, respectively;

a fourth key array having a plurality of input means mounted to said housing, said third array aligned along a path substantially parallel to a longitudinal axis of an extended third finger of the hand such that the fourth key array is operable by the third finger when the thumb, first finger and second finger are operably positioned proximal to said first, second and third arrays, respectively;

a fifth key array having a plurality of input means mounted to said housing, said fifth array aligned along a path substantially parallel to the longitudinal axis of an extended fourth finger such that said fifth key array is operable by the fourth finger when the thumb, first finger, second finger and third finger of the hand are operably positioned proximal to said first, second, third and fourth arrays, respectively, wherein said first and said fifth key arrays are configured to be mutually interchangeable, said housing being arranged to receive said mutually interchangeable first and fifth key arrays in either configuration, permitting said input device to be operable alternately by the left and the right hand, and the input means of said second, third, fourth and fifth arrays including single key stroke input keys which permit the entry of a single character by the activation of one of said keys providing a spacing between said key arrays maximized at the positions corresponding to the maximum extension of corresponding finger.

33. The input device according to claim 32, wherein said device includes a plurality of label means each disposed in close association with a corresponding key, said label means being viewable while the fingers are in contact with said corresponding key.

34. The input device according to claim 33, wherein said labels comprise changeable display means for displaying selected input values of each corresponding input means by the use of a control key.

* * * * *